United States Patent [19]
Kuenzig

[11] Patent Number: 5,572,570
[45] Date of Patent: Nov. 5, 1996

[54] TELECOMMUNICATION SYSTEM TESTER WITH VOICE RECOGNITION CAPABILITY

[75] Inventor: John F. Kuenzig, North Chelmsford, Mass.

[73] Assignee: Teradyne, Inc., Boston, Mass.

[21] Appl. No.: 321,357

[22] Filed: Oct. 11, 1994

[51] Int. Cl.$^6$ .............................. H04M 1/24; H04M 3/08; H04M 3/22
[52] U.S. Cl. .................................. 379/1; 379/9; 379/10; 379/12; 379/14; 379/15; 379/27; 379/29; 379/32
[58] Field of Search .............................. 379/1, 9, 10, 12, 379/18, 14–15, 69, 88, 89, 27, 29, 32

[56] References Cited

U.S. PATENT DOCUMENTS

| | | | |
|---|---|---|---|
| 4,314,110 | 2/1982 | Breidenstein | 379/18 |
| 4,580,016 | 1/1986 | Williamson | 379/31 |
| 4,629,836 | 12/1986 | Walsworth | 379/12 |
| 5,065,422 | 11/1991 | Ishikawa | 379/18 |
| 5,359,646 | 10/1994 | Johnson | 379/27 |
| 5,384,822 | 1/1995 | Brown | 379/10 |

*Primary Examiner*—Wellington Chin
*Assistant Examiner*—Vijay Shankar

[57] ABSTRACT

Connection is made directly or via a switched telephone network between a tester and a telecommunication system to be tested. User data, such as voice signals, and signalling data, such as DTMF signals are generated by the tester to cause the telecommunication system to respond. The user and signalling data may be generated interactively to test the telecommunication system in real time, or by executing prerecorded scripts. When the tester is used interactively, the representations of the signals transmitted to and from the tester are recorded in at least one script file. Voice recognition is preferably used to determine whether the response received from the telecommunication system is the expected response, particularly when a script is executed. The vocabulary used for voice recognition may be created by repeatedly executing a script file (recorded during interactive operation of the tester or created manually) which causes the telecommunication system to generate the desired prompt(s) and message(s). Alternatively, the vocabulary may be obtained in other ways, such as by reproducing voice signals at the telecommunication system.

30 Claims, 2 Drawing Sheets

Microfiche Appendix Included
(4 Microfiche, 364 Pages)

TELECOMMUNICATION SYSTEM TESTER WITH VOICE RECOGNITION CAPABILITY

REFERENCE TO MICROFICHE APPENDIX

A microfiche appendix of 4 fiche having 364 frames is included as part of this application for patent.

BACKGROUND OF THE INVENTION

1. Field of the Invention

The present invention relates to a method and apparatus for testing a telecommunication system and more particular, to detecting signals generated by a telecommunication system, such a as a voice processing system providing voicemail, or automated attendant, or interactive voice response, etc.; or an automatic call distributor; or a computer-telephone integration system; or command and control components of a switching system; or other networks and enhanced services provided via public or private switched telephone networks, to evaluate the operation, accuracy and quality of the telecommunication system, including machine produced voice signals generated by the system.

2. Description of the Related Art

For over a century, the public switched telephone network (PSTN) was used primarily to provide voice communication between two human beings using telephones. In the last quarter century or so the PSTN has increasingly been used to provide communication with or between machines, such as computers and facsimile machines. During the last decade and a half, use of the PSTN has expanded to include communication between human beings using telephones and machines which reproduce voice signals that have been previously recorded. The term telecommunication system will be used to refer to equipment which performs voice processing, such as voicemail, automated attendant, interactive voice response (IVR), etc. In addition, the term telecommunication system as used herein includes systems which provide computer-telephone integration (CTI), automatic call distribution (ACD) and many other functions in addition to the more traditional functions of telecommunication systems such as those provided by private branch exchanges (PBXs), central office (CO) equipment, etc.

Prior to the development of new telecommunication functions in the last two decades or so, telecommunication systems were primarily tested by establishing that a voice conversation could be carried from point A to point B. As a result, telecommunication systems have conventionally been tested to determine that connections are made properly and signal quality is satisfactory. While both proper connections and signal quality still need to be tested, the additional functions performed by many different types of telecommunication systems require that a much different type of testing be performed. Initially, human beings were used to test telecommunication systems having voice processing capability.

The assignee of the present invention introduced the Hammer™ testing and monitoring system in 1992. The Hammer™ system uses a personal computer with voice processing capability to execute "programs" written in a language similar to BASIC with extensions for control of the voice processing and telecommunication capabilities of the computer. The extensions include the ability to play prerecorded voice messages, generate dual tone multifrequency (DTMF) and multifrequency (MF) signals for controlling telecommunication systems, such as voicemail systems and switching systems in the PSTN, respectively. In addition, an RS-232 serial port provided in the Hammer™ system can transmit and receive out-of-band signals. As a result, the previously available Hammer™ system can be programmed to test a wide variety of functions provided by telecommunication systems. All that is required is initiation of a stored program by a human operator.

Despite the significant advancements of the Hammer™ system over the totally or near totally manual testing methods that were used before introduction of the Hammer™ system, there are several drawbacks to the previously available Hammer™ system. These drawbacks include the significant amount of time and knowledge required to prepare "programs" to perform automatic testing of telecommunication systems; the need to create each "program" prior to performing testing (batch processing only); the need for human beings to initiate execution of each "program"; and the need for human beings to evaluate the voice signals generated by telecommunication systems under test. No other known test system provided these features prior to the development of the present invention.

SUMMARY OF THE INVENTION

An object of the present invention is to support the gathering, management and quality control of speech and data samples from the speech and data interfaces of a telecommunication system running any telephony application which includes a speech or data interface.

Another object of the present invention is to reduce human involvement required during testing of telecommunication systems, particularly systems which automatically generate voice signals.

A further object of the present invention is to simplify the generation of "programs" for controlling telecommunication system test equipment.

A still further object of the present invention is to enable testing a telecommunication systems at any time without requiring initiation of testing at that time by a human being.

Another object of the present invention is to provide computer controlled test equipment capable of testing telecommunication systems interactively, particularly over a switched telephone network.

Yet another object of the present invention is to improve the collection of data concerning operation of a telecommunication system under test.

A still further object of the present invention is to provide automatic voice recognition of responses generated by a telecommunication system under test.

These objects are attained by providing a method of testing a telecommunication system including generating, in a data processing device, test signals simulating at least one of the user data and signaling data transmissible by a telecommunication network; transmitting the test signals to the telecommunication system; recording representations of the test signals in the data processing device during the generation or transmitting of test signals; and detecting response signals produced by the telecommunication system in response to the test signals. The user data will often constitute voice signals, but could also include machine generated signals, such as those generated by a facsimile machine, which are treated as a message from a user of the telecommunication system rather than being used to control the telecommunication system. The signaling data includes nonvoice signals, such as DTMF signals which are detected by the telecommunication system to change the service provided a user of the system, as well as other in-band control signals, such as multifrequency signals used to control switching of telecommunication systems and out-of-band signals, such as simplified message desk interface (SMDI), automatic number identification (ANI) and dialed number identification services (DNIS). Also included in the signaling data are signals such as the reversal of polarity or "winking" of telecommunication signal lines. Timing information is also recorded.

According to the present invention telecommunication systems are tested using a data processing device controlled by a processor having capabilities similar to that provided by an INTEL 80386, or preferably 80486 microprocessor connected to telecommunication interface devices capable of generating DTMF and other in-band signals in addition to voice signals and preferably including voice recognition capability. In a preferred embodiment, voice recognition is provided by a peripheral device connected to the microprocessor and software primarily executing on that peripheral device. The data processing device also includes sufficient main memory and long-term storage (currently typically provided by hard disk drives) to store the operating system, test application programs and "scripts" executed by the microprocessor to test complex telecommunication systems. Also included is an audio output device, such as a conventional speaker, or headphone (not shown).

A data processing device used, according to the present invention, for testing telecommunication systems is programmed to permit interactive generation of the test signals (both voice and non-voice) while connected either directly, or via the PSTN, to the telecommunication system under test. Connections may include a serial line connection to enable generation and detection of out-of-band signals by the data processing device.

During interactive generation of the test signals, a sampler script containing representations of the test signals and a recognizer script containing representations of both the test signals and responses thereto, are stored in the long-term memory of the data processing device. Either of these scripts can be edited and reproduced with or without editing, to perform further testing of the telecommunication system under test. The sampler script may be used to generate a plurality of samples of voice signals produced by the telecommunication system. These samples can, in turn, be used to build a vocabulary for use by the voice recognition equipment in the data processing device. The recognizer script, after editing if necessary, can be used to test the telecommunication system to determine whether subsequent voice response signals match the expected voice response signals. These capabilities enable the present invention to be used for in-service testing when the telecommunication system is available for serving calls from users, as well as in a laboratory environment.

These objects, together with other objects and advantages which will be subsequently apparent, reside in the details of construction and operation as more fully hereinafter described and claimed, reference being had to the accompany drawings forming a part hereof, wherein like reference numerals refer to like parts throughout.

DESCRIPTION OF THE PREFERRED EMBODIMENTS

Figure 1:
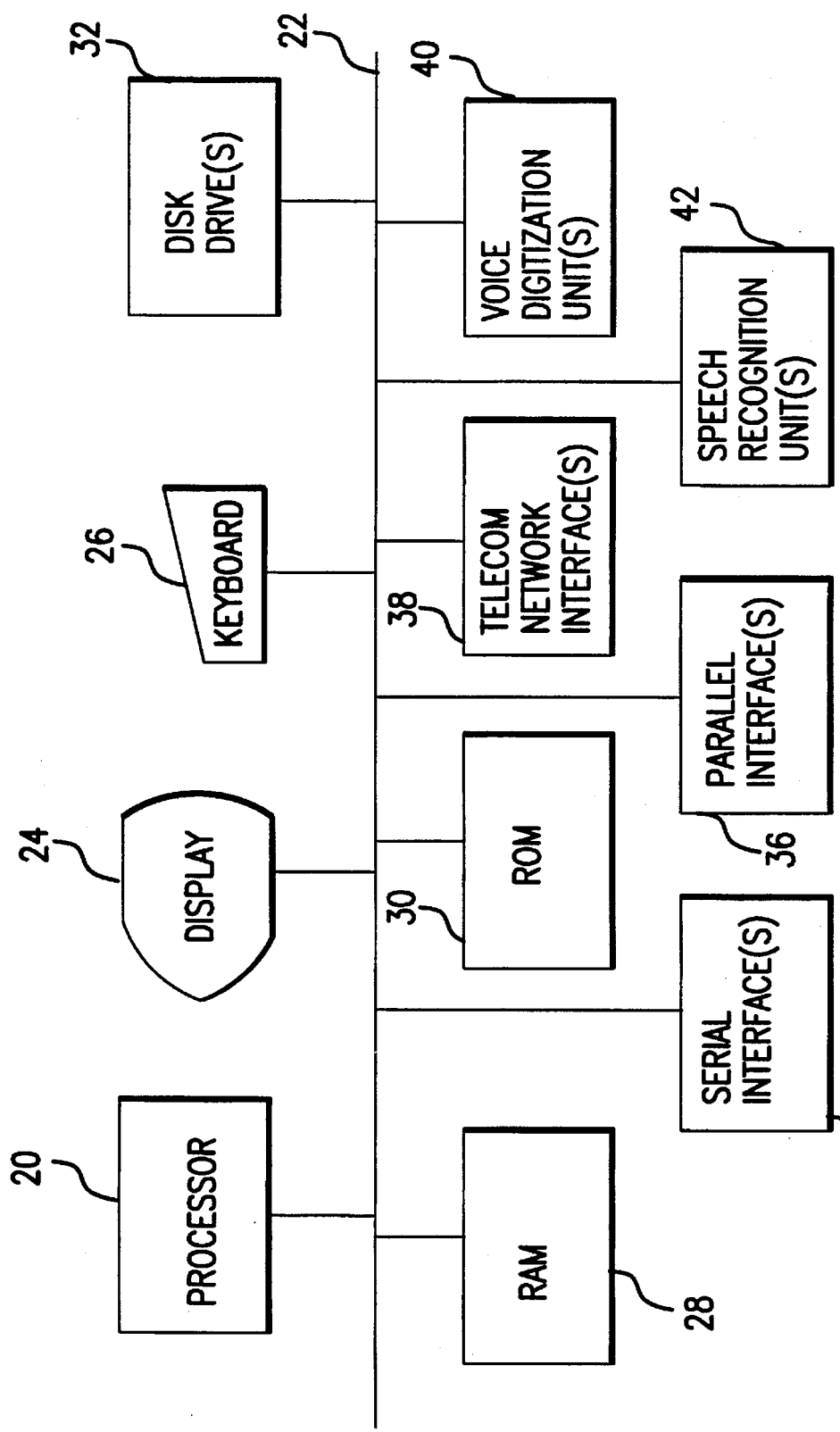
FIG. 1 is a block diagram of a data processing device for testing telecommunication systems according to the present invention.

Previously, it was sufficient to simply qualify the transmission quality of telecommunication networks, but now it has become necessary to qualify the characteristics of the automated system answering the phone in order to ensure customer satisfaction. This is a far more complex test task and telecommunication test technology has not kept pace with this evolution in requirements.

To adequately monitor these automated systems, both the application itself and the quality of the transmission media between the caller and the system answering the phone must be checked. The test tool must both provide the normal inputs provided to the system being tested, as well as monitor the responses from the system being tested.

The possible responses of a system being tested include signalling data and user data, typically voice signals (i.e., something recognizable by the human ear as representative of human speech), or machine data (i.e., something that a machine can recognize but the human ear cannot) which may or may not be presented in the range of normal human hearing. To measure customer satisfaction, these responses must be measured in terms of time, frequency, and quality.

Present-day telephony applications typically reside on automated systems composed of one or more subsystems, both hardware and software modules, each of which must be tested independently of each other to ensure proper interoperability. In the process of development, it is important to provide "real world" test conditions as early as possible in the product lifecycle. Once each new application has been developed and deployed, the application must be monitored to ensure proper use and function.

To test the entire application in the development phase requires testing from the end-user's perspective, simulating an actual caller's inputs, and measuring the application's responses. In many cases this requires providing many hundreds of possible user inputs to the embryonic application, and measuring many hundreds of possible responses. It is therefore of paramount importance that the test system support easy data collection mechanisms, and support easy management of test suites as well as their results.

The internal architecture of modern-day telecommunication systems is typically very complex, and the traditional test methods are not effective. The traditional link or "continuity" testers will indicate everything is okay after the target system has picked up the phone line. The system could say: "I'm sorry, please call again in 5 years" and the traditional test methods would indicate a satisfactory result if the signal level of that message met predefined parameters.

The present invention determines that a telecommunication system's speech interface is accurate by training the test system to recognize the telecommunication system's speech interface. Factors which must be taken into account include the changing nature of the phone lines connecting the typical caller to the application, the variance in the application due to different loading conditions, and a multitude of other considerations. Thus, it is important to capture samples of the speech interface in an environment as close as possible to that which the system will see in actual use. Speech recognition of the target system's voice processing interface might work very well in a laboratory environment, but not work well at all after the application is deployed, if the samples gathered in the laboratory are not representative of the real world conditions experienced in the field.

Having captured potentially thousands of speech samples, the present invention is able to easily capture additional samples of the same speech segments from the application running on the telecommunication system being tested, to allow for differences in operating conditions. The present invention provides tools that are easy to use and modify to support the capture and later recognition of speech samples gathered from the system being tested. In addition, subsequent management of the testing process is provided along with automation tools which help the test designer handle the profusion of speech interfaces that are likely to be encountered.

As illustrated in FIG. 1, a data processing device according to the present invention includes the components illustrated in FIG. 1. A processor 20, such as a microprocessor having the capabilities of an INTEL 80386 or preferably i486, is connected to a number of other components via a bus 22, such as an industry standard architecture (ISA) bus. These components include the conventional components of a personal computer, such as a display 24 and keyboard 26 or other input device, such as a touch screen, digitizer pad, pen input device, mouse, etc. In addition, random access memory (RAM) 28 provides system memory and may be connected via the bus 22 or a separate bus to the processor 20. Read only memory (ROM) 30 typically stores basic input/output system (BIOS) programs to control operation of the computer system. Also, some type of memory is provided for long-term storage, such as one or more disk drives 32, e.g., hard disk drives and floppy disk drives, or tape drives, flash memory, bubble memory or any other technology for non-volatile storage.

A data processing device according to the present invention includes a number of interfaces for communication with external devices. Conventional serial 34 and parallel 36 interfaces are provided for connection to printers and conventional communication devices such as modems. In addition, at least one serial interface 34 is used by a data processing device according to the present invention to communicate with telecommunication systems using the SMDI protocol. Unlike conventional personal computers, a data processing device according to the present invention also includes one or more telecommunication network interfaces 38 which can be connected to telecommunication equipment in the same manner as a standard telephone or conventional telephone network equipment, such as a PBX. Examples of telephone network interface cards include models DTI/211, DTI/101 and LSI/120 manufactured by Dialogic Corporation of Parsipanny, N.J. Voice digitization units 40 provide the ability to store and output voice signals. Examples of voice digitization units include models D121B and D41D available from Dialogic Corporation. To enable the data processing device to recognize voice signals from a telecommunication system under test, speech recognition units 42, such as Vpro42 or Vpro84 from Voice Processing Corporation of Cambridge, Mass. are provided.

To enable the data processing device illustrated in FIG. 1 to operate according to the present invention, programs are stored in the long-term storage 32 and loaded into the RAM 28 for execution. In one embodiment of the present invention, these programs include a UNIX operating system from Santa Cruz Operation, Inc. of Santa Cruz, Calif., the C language routines in the microfiche appendix, and software provided by Dialogic Corporation and Voice Processing Corporation to interface with the interface(s) 38 and units 40 and 42. Additional C language routines which can be provided by an ordinarily skilled C programmer are also stored in the long-term storage 32. While the C language is used in the disclosed embodiment, as known in the art, the same functions could be provided by a wide range of data processing systems, from other microprocessor controlled computers to supercomputers, executing programs written in any language or combination of languages which can provide control of components capable of connection to a telecommunication system.

When the contents of the microfiche appendix are used to control the data processing device illustrated in FIG. 1, the main routines are in the channel.c file. These routines provide the ability to control the interface(s) 38 and units 40 and 42 to test a telecommunication system connected to the data processing device by playing scripts written in a language similar to BASIC with commands that control the interface(s) 38 and units 40 and 42. The commands in the language implemented using the programs in the microfiche appendix appear in the case statements on pages 19–84 of channel.c in the channel_main routine.

A user controls testing of the telecommunication system through the execution of the routines in the console.c file. The routine do_console_mode receives input from the keyboard and interfaces with the interface(s) 38 and unit(s) 40 through an interface to the routines provided by Dialogic Corporation. The routine disp_status_line displays a status line on the display 24 indicating how the telecommunication system is connected.

Figure 2:
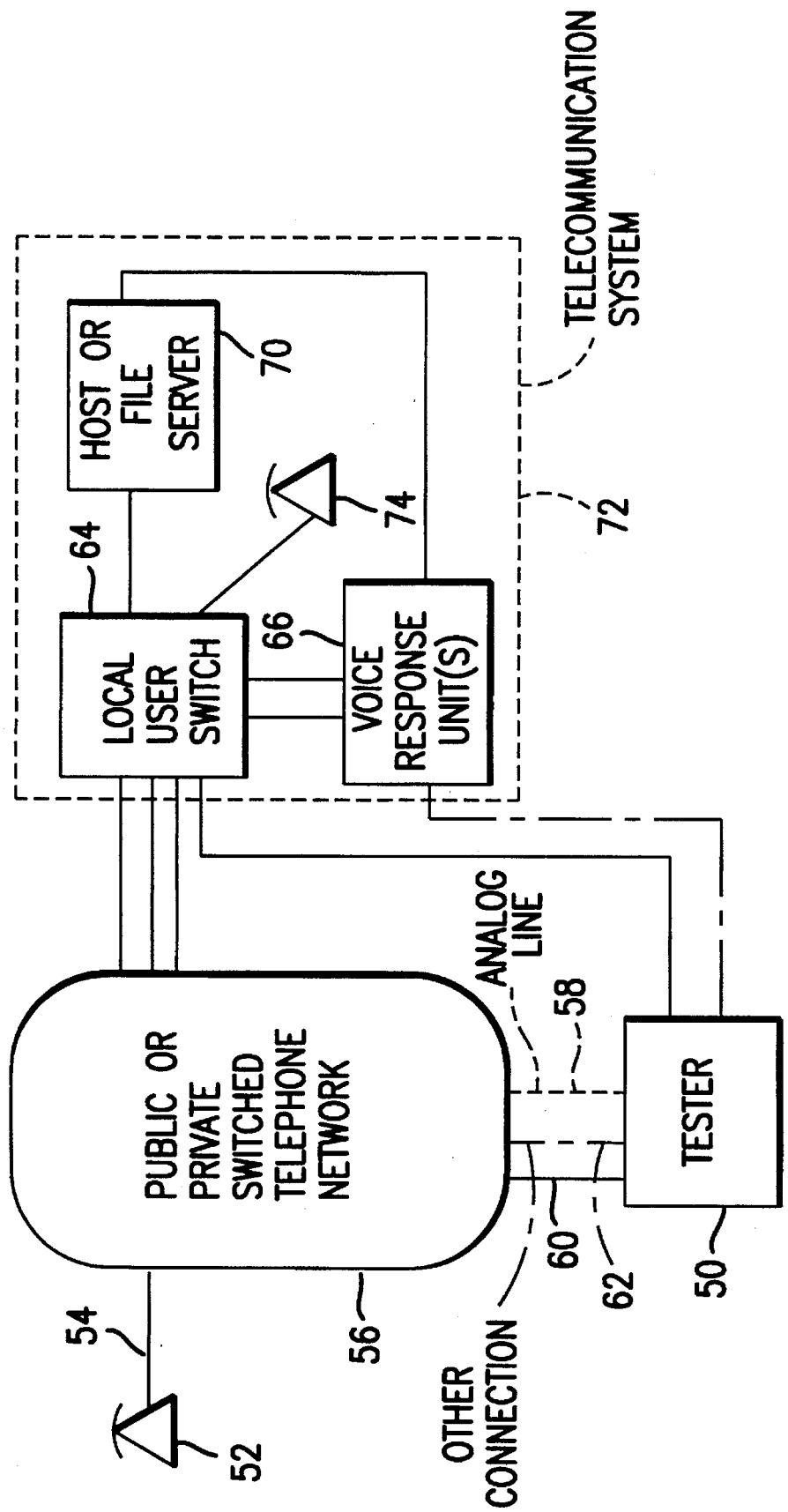
FIG. 2 is an example of the data processing device illustrated in FIG. 1 connected to a telecommunication system for purposes of testing the telecommunication system.

There are several ways in which the data processing device illustrated in FIG. 1 can be connected to a telecommunication system to be tested. In FIG. 2 dashed and dotted lines are used to illustrate alternative connections between a tester 50, which may be constructed as illustrated in FIG. 1, and a telecommunication system to be tested. The standard telephone or POTS 52 would be connected via a standard analog line 54. The tester 50 may be connected to a switched telephone network 56 via an analog line 58, digital line 60, or other connection 62. The tester 50 may also be more directly connected to a local user switch 64 or voice response unit 66 by any connection supported by the switch 64 or unit 66. The routines in make_conn.c establish the protocol used by four different connections under the control of make_connection: (1) a standard analog connection; (2) a call driver connection for connecting the tester 50 to several POTS connections on the telecommunication system being tested; (3) a ringdown connection via a ringdown box, such as a model AS-66 from Skutch Electronics of Roseville, Calif.; and (4) a digital connection, e.g., via a T1 line.

In the preferred embodiment, the programs executed by the tester 50 provide the capabilities of soundseer.c in the microfiche appendix. The routines in console.c are called by soundseer.c to provide an interactive interface in real time between a human operator of the tester 50 and the telecommunication system under test. The operator can instruct the tester 50 to select an available channel (pick_available_channel and get_channel); establish a connection with the telecommunication system to be tested (e.g., using get_a_dialer, make_connection, do_analog_connect, do_calldriver_connect, do_ringdown_connect and do_t1_connect); generate DTMF and MF signals (ch_dial) and other signalling data such as winks (ch_wink), flashhook (ch_dial) and on-hook and off-hook (ch_onhook and ch_offhook) using the telecommunication network interface(s) 38; reproduce voice signals or other user data by playing back previously stored files (ch_play); receive signalling data, such as DTMF and MF (ch_getdig); wait for energy (ch_wtnsil) or silence (ch_wtfsil) on line; and record samples of user data, such as voice signals generated by the telecommunication system (ch_record).

In the preferred embodiment codes are stored in a temporary file representing everything generated by the tester 50 during each interactive session. Preferably a separate file is created with representations of the response(s) by the telecommunication system under test. In the remainder of the description of the invention, the former file will be referred to as a sampler script and the latter file will be referred to as a recognizer script. The signals transmitted to and from the tester 50 sampler and recognizer scripts may be recorded in the temporary files by routines like add_to_sampler_script and add_to_recognizer_script, respectively, in the back-end.c file in the microfiche appendix.

While it would be possible to record only the recognizer file and edit the file after a session to obtain the contents of the sampler file, in many cases both files are needed and so it is preferable to record two temporary files and have the operator indicate which one(s) to save permanently. When the operator of the tester 50 leaves the real time interactive mode, the operator is preferably prompted to save each of the sampler and recognizer scripts (do_console_mode calls save_test_script in console.c).

The information recorded in the sampler script includes representations of signalling data, such as DTMF signals, MF signals, changes in polarity ("winking" of analog line), etc. Also stored is timing information regarding when the signalling data is generated and when a response is expected from the telecommunication system under test. Information identifying prerecorded files transmitted to the telecommunication system under test is also recorded. In addition, changes to the status of the tester 50 are also recorded. For example, when the tester 50 executes the programs in the microfiche appendix, there are several toggled states, such as DTMF/MF signal generation, which are recorded as comments in the sampler and recognizer scripts.

The recognizer script records everything in the sampler script and also records representations identifying what was received by the tester 50 from the telecommunication system. Under certain known and common circumstances the output from the tester 50 provides a stimulus which is expected by the operator to elicit a particular response from the telecommunication system under test. The expected response is indicated by the operator after an instruction is input to produce the stimulus. For example, the operator may press "1" to enter a voice mailbox number on the system under test and then press "r" to instruct the tester 50 to expect a response from the system, i.e., to perform a recognize command.

In executing the recognize command, the tester 50 will accept one or more of DTMF, MF and voice signals as valid responses, depending on the current state of the internal toggle "collection_type" which is found in the structure "session" defined in the soundseer.h file in the microfiche appendix. If the current collection_type is DTMF, the sampler script would contain an instruction to gather DTMF digits from the system under test. The recognizer script would, in addition to this instruction, contain instructions to save the digits collected, and compare them to the digits collected in the interactive session. Likewise, if the collection_type was voice, the sampler script would contain instructions to gather machine generated speech signals and the recognizer script would also contain instructions to get a speech recognition unit 42 to use, tell the speech recognition unit to listen to the line connected to the telecommunication system under test and try to determine what was heard, and compare that with the expected response. Thus, where the sampler script only causes the stimuli/response pattern to happen, the recognizer script determines whether the response was the proper and expected one, and provides an indication of success or failure of the telecommunication system to generate the expected response.

In the preferred embodiment, the operator is able to replay the sampler and recognizer scripts during interactive operation of the tester 50, or at a time in the future scheduled by a command from the operator. An operator of the tester 50 may edit either the sampler or recognizer script prior to being replayed using a conventional text editor.

One of the uses of the sampler script is to obtain several samples of the same segment of machine generated speech or voice response signals from the telecommunication system for use by the speech recognition unit(s) 42. As discussed above, during interactive use an operator can issue a command from the keyboard to save voice signals, received from the telecommunication system under test, in a file. The instruction to store voice signals in a file would be saved in the sampler script. If no instruction is issued during the interactive session which created the sampler script, the sampler script may be edited to add instruction(s) at the desired point(s).

The speech recognition unit(s) 42 use vocabulary files to recognize speech. Vocabulary files may be created (using ch_create_disc_vocab if using the programs in the microfiche appendix) and modified (ch_load_disc_vocab). The operator of the tester 50 can then listen to and name a sample file (play_and_name_sample) and, if desired, add that sample to the current vocabulary (save_to_vocab_name). The new sample will then be added to the current vocabulary (ch_add_pronunciation) in the event the operator wishes to save the vocabulary later. The speech recogniton routine names with the prefix "ch_" can be found in the srec.c source file and other routines can be found in the vocab_utils.c source file.

In the preferred embodiment routines in build_vocab.c in the microfiche appendix can be used to automatically create vocabulary files. A new vocabulary is created (_build_new_vocab) the samples are named(_rename_existing_files) and moved to a new vocabulary location (_move_vocab_files). The routines load_vocab_from_samples and save_vocab in the vocab_utils.c source file are called by the routines in build_vocab.c to perform these functions.

After creation, either manually or automatically, a vocabulary may be edited by adding words as described above, by playing an existing sample from the vocabulary (ch_play) and by deleting a word in the vocabulary (remove_word_from_vocab). The modified (or newly created) vocabulary may be saved for permanent use (ch_create_disc_vocab and save_vocab). All samples in the new vocabulary are preferably loaded into a speech recognition unit 42 at this time (load_vocab_from_samples).

The vocabulary can be stored for use by any test script, including recognizer scripts, but also including test scripts generated manually. Similarly, the samples of speech can be obtained using sampler script(s) or any other means, such as from an operator of the telecommunication system under test. If subsequent testing via the PSTN (e.g., in service testing) is to be performed, it is generally preferable to obtain the speech samples when the tester 50 is connected via the PSTN, since signal quality can vary.

An example of how the present invention can be used to test a telecommunication system will be provided with reference to FIG. 2. In normal operation, a caller on telephone 52 dials a telephone number which the switched telephone network 56 determines should be connected to local user switch 64. As indicated in FIG. 2, the switched telephone network 56 may be the PSTN or a private network. The local user switch 64 connects the telephone 52 to voice response unit 66. Voice response unit 66, for example, may request data from the caller by playing a prompt, such as "Please enter your credit card number." After receiving the desired information from the caller, e.g., in the form of DTMF signals or a voice command, voice response unit 66 may generate another prompt, such as "To check an account balance, select 1; to talk to a customer service representative, select 2." IF the caller requests an account balance, the voice response unit 66 issues a request for the account balance over data link 68 to host or file server 70. If an account balance is received, the voice response unit 66 will convert the account balance into voice signals. However, if the account balance is not obtained due to a failure in the data link 68, host or file server 70 or voice response unit 66, the voice response unit will generate a message such as "Your account balance is not currently available, please try again later."

In the example illustrated in FIG. 2, the tester 50 is connected in such a manner that in-service testing may be performed. In other words, callers like the one discussed above may be using the telecommunication system 72 at the same time as the tester 50. In addition, multiple calls can be generated by the tester 50 using different ports. This enables the tester 50 to test the telecommunication system 72 under real world conditions with varying amounts of load.

By using voice recognition of the prompts and messages generated by the voice response unit 66, the tester 50 is able to make determinations of what components of the telecommunication system 72 are operating properly. For example, if the initial prompt is received from the voice response unit 66, it can be determined that the local user switch 64 connects to the voice response unit 66. Without voice recognition, the voice signals received could be from the telephone 74 of one of the agents of the organization using the telecommunication system 72 to provide services to callers. A test script can be generated to test a number of different connections that the local user switch is capable of making, using voice recognition and other types of signal detection, e.g., facsimile and modem handshaking protocols, etc.

This type of testing to determine whether all services provided by a telecommunication system are accessible may involve more than a single switch. Present-day telecommunication systems often use a combination of private and commercial networks, such as MCI and SPRINT, to provide services to users. Due to the complexity of such telecommunication systems, it is not uncommon for problems to occur and, on the other hand, it is difficult to perform a complete test of such telecommunication systems without using a tester like the Hammer™, preferably configured to provide the functions of the present invention. A test script can be generated by calling all of the services provided by the telecommunication system 72 while in the interactive mode of the tester 50. The resulting recognizer script, after editing if necessary, can be scheduled to be executed periodically to verify that all of the services are available. The recognizer script will include an instruction to verify that the initial voice signals received from each service which generates voice prompts match the expected greeting. For example the following code may be created in a recognizer script:

```
ENABLE_SPEECH_RECOG
LOAD vocab_name
RECOG_DISCRETE 2000 3000 2000
IF $$PHRASE1 !=expected_prompt
    SET_FAILURE
ENDIF
```

These statements will obtain access to one of the speech recognition units 42, listen to the line connected to one of the ports, compare what is "heard" with the "expected_prompt" and inform the operator if what is "heard" does not match. The speech recognition unit(s) 42 in the tester 50 will use vocabulary created from one or more samples of the greeting generated by the service. The samples can be obtained using the sampler script recorded at the same time as the recognizer script or by any other means.

The same test script used to test the local user switch 64 or another test script may be used to test all or a portion of the voice prompts and messages which the voice response unit 66 is capable of generating. The test script could perform a complete test of all of the prompts which can be generated by each application using the voice response unit 66. This is called a regression test. However, since some applications are very complex, the test script could be written to test one user interface at a time, e.g., to test that all of the prompts at a particular level in the logic tree of the application are generated. In the example given above, this would mean verifying that the messages providing the account balance and stating that the account balance is not available, plus any other messages or prompts which may be produced in response to entering the correct account number, are generated under appropriate circumstances.

Another type of test which can be performed by a tester according to the present invention is feature testing of an application provided by a telecommunication system. Unlike the user interface test described above, feature testing emphasizes that when proper responses are provided, the desired service is provided. For example, the tester 50 can be used to test an outdialing feature of a voice mail system. Assuming that a subscriber account has been set up on the host 70 for purposes of testing, a test script can be created which will specify the number to be called (unless this has to be done by the administrator of the telecommunication system 72) which will access one of the ports on the tester 50. The test script can then generate the series of signals, voice or non-voice, as needed to cause the telecommunication system 72 to call the number specified. Using voice recognition, the tester 50 can determine that the port connected to receive calls to the specified number received the expected voice signals generated by the telecommunication system.

The many features and advantages of the present invention are apparent from the detailed specification and thus, it is intended by the appended claims to cover all such features and advantages of the system which fall with the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, as falling within the scope and spirit of the invention.

What is claimed is:

1. A method of testing a telecommunication system, connectable to a telecommunication network, comprising the steps of:
- (a) generating, in a data processing device, test signals simulating at least one of voice and non-voice signals transmissible by a telecommunication network;
- (b) transmitting the test signals to the telecommunication system;
- (c) detecting response signals produced by the telecommunication system in response to the test signals, said response signals including initial voice response signals generated automatically by the telecommunication system;
- (d) recording at least one sampler script including representations of only the test signals generated in step (a);
- (e) recording at least one recognizer script including representations of booth the test signals generated in step (a) and the response signals detected in step (c);
- (f) repeatedly reproducing the test signals using the at least one sampler script recorded in step (d);
- (g) reproducing the test signals using the at least one recognizer script recorded in step (e);
- (h) detecting subsequent voice response signals produced by the telecommunication system in response to the test signals reproduced in step (f);
- (i) recording the subsequent voice response signals, wherein said recording in step (i) is repeated to obtain a plurality of voice response files, at least one of the voice response files obtained for each repetition of the test signals reproduced in step (f);
- (j) building a vocabulary file, wherein said building of the vocabulary file in step (j) uses the voice responses files recorded in step (i);
- (k) detecting subsequent voice response signals produced by the telecommunication system in response to the test signals reproduced in step (g); and
- (l) performing automatic voice recognition on the subsequent voice response signals detected in step (k) using the vocabulary file built in step (j), wherein said detecting in step (k) and the automatic voice recognition in step (l) are performed.

2. A method as recited in claim 1,
wherein said reproducing in step (g), said detecting in step (k), and the automatic voice recognition in step (l) are performed repeatedly while the telecommunication system is available to serve calls from users.

3. A method of testing a telecommunication system, connectable to a telecommunication network, comprising the steps of:
- (a) generating, in a data processing device, test signals simulating at least one of voice and non-voice signals transmissible by a telecommunication network;
- (b) transmitting the test signals to the telecommunication system;
- (c) detecting response signals produced by the telecommunication system in response to the test signals;
- (d) recording at least one sampler script including representations of only the test signals generated in step (a);
- (e) recording at least one recognizer script including representations of both the test signals generated in step (a) and the response signals detected in step (c);
- (f) executing the at least one sampler script to control the substeps of
  - (f1) reproducing the test signals recorded in step (d), and
  - (f2) recording initial voice response signals generated in response to the test signals reproduced in step (f1); and
- (g) executing the at least one recognizer script to control the substeps of
  - (g1) reproducing the test signals recorded in step (e),
  - (g2) detecting subsequent voice response signals generated in response to the test signals reproduced in step (g1), and
  - (g3) automatically performing voice recognition on the subsequent voice response signals detected in step (g2) based on the initial voice response signals recorded in step (f2).

4. A tester for a telecommunication system connectable to a telecommunication network, comprising:
- at least one processor controlling generation of test signals simulating at least one of voice and non-voice signals transmissible by the telecommunication network;
- at least one interface, coupling said processor to the telecommunication system, to transmit the test signals and to receive response signals generated by the telecommunication system in response to the test signals, said response signals including voice response signals;
- at least one storage device, coupled to at least said processor, storing the test and response signals; and
- at least one speech recognition device, coupled to at least said processor, for analyzing the voice response signals.

5. A method of testing a telecommunication system including a voice response unit using a data processing device, comprising the steps of:
- (a) receiving commands from a human operator of the data processing device to test the telecommunication system in real-time;
- (b) generating, in the data processing device, test signals simulating user data and signaling data;
- (c) transmitting the test signals to the telecommunication system;
- (d) recording representations of the test signals in a sampler and recognizer scripts in temporary storage on the data processing device;
- (e) storing representations of response signals produced by the telecommunication system in the recognizer script, including machine produced voice signals from the voice response unit and instructions to perform speech recognition on the machine produced voice signals;
- (f) repeating steps (a)–(e) until a command is received from the human operator to step;
- (g) prompting the human operator to save the sampler and recognizer scripts;
- (h) storing each of the sampler and recognizer scripts in separate permanent files when instructed by the human operator in response to said prompting in step (g);
- (i) repeatedly reproducing the sampler script to obtain a plurality of vocabulary samples of the machine produce voice signals from the voice response unit;
- (j) automatically building a vocabulary of words from the samples obtained during said reproducing in step (i); and
- (k) reproducing the recognizer script to obtain at least one test sample of the machine produced voice signals from the voice response unit and to automatically perform speech recognition on the test sample using the vocabulary built in step (j).

6. A method as recited in claim 5, further comprising the steps of:
   (l) connecting the data processing device to the telecommunication system via a switched telephone network in response to the commands received in step (a); and
   (m) repeatedly performing said reproducing in step (k) during operation of the telecommunication system to serve users.

7. A tester as recited in claim 4,
   wherein said interface includes an analog connection, a call driver connection, a ringdown connection, and a digital connection, thereby allowing the tester to operate with or without connection to a telecommunication network.

8. A method of testing a telecommunication system, the system having a speech interface and being connectable to a telecommunication network, comprising the steps of:
   (a) receiving voice signals produced by the telecommunication system;
   (b) transmitting test signals to the telecommunication system; and
   (c) evaluating voice response signals using the voice signals received in step (a), said voice response signals produced by the telecommunication system in response to the test signals transmitted in step (b), thereby determining whether the telecommunication system is operating properly.

9. A method as recited in claim 8,
   wherein said telecommunication network is a public switched telephone network.

10. A method as recited in claim 8,
    wherein said receiving in step (a) includes the substeps of:
    (a1) adding representations of said voice signals to a vocabulary file, and
    (a2) optionally editing the vocabulary file.

11. A method as recited in claim 10,
    wherein said editing in step (a2) includes the substeps of:
    (i) listening to at least one of said representations of voice signals in the vocabulary file, and
    (ii) optionally deleting the representations of voice signals listened to in step (i).

12. A method as recited in claim 10,
    wherein said evaluating in step (c) includes the substeps of:
    (c1) comparing said voice response signals with said representations of voice signals in the vocabulary file to determine whether the voice response signals match any of the representations in the vocabulary file,
    (c2) comparing the representations that match the voice response signals with expected response data to determine whether the telecommunication system produced the proper voice response signals, and
    (c3) indicating whether the telecommunication system produced the proper voice response signals in response to the test signals transmitted in step (b).

13. A method of testing a telecommunication system, the system being connectable to a telecommunication network, comprising the steps of:
    (a) interactively transmitting test signals to the telecommunication system and detecting initial response signals produced by the telecommunication system;
    (b) automatically recording representations of both the test signals transmitted and the initial response signals detected in step (a);
    (c) reproducing the test signals recorded in step (b);
    (d) evaluating subsequent response signals produced by the telecommunication system in response to the test signals reproduced in step (c) to determine whether the telecommunication system is operating properly.

14. A method as recited in claim 13,
    wherein said initial response signals include voice response signals, and
    wherein said interactively transmitting and detecting in step (a) is performed by a human operator who can hear the voice response signals.

15. A method as recited in claim 13,
    wherein said interactively transmitting and detecting in step (a) comprises the substeps of:
    (a1) transmitting test signals to the telecommunication system,
    (a2) detecting initial response signals produced by the telecommunication system,
    (a3) transmitting test signals to the telecommunication system based on the initial response signals detected in step (a2), and
    (a4) repeating steps (a2) and (a3) until the telecommunication system is fully tested.

16. A method as recited in claim 13,
    wherein said recording in step (b) comprises the substeps of:
    (b1) automatically recording at least one file including representations of only the test signals transmitted in step (a), and
    (b2) automatically recording at least one file including representations of both the test signals transmitted and the initial response signals detected in step (a).

17. A method as recited in claim 16,
    wherein said evaluating in step (d) comprises the substeps of:
    (d1) comparing said subsequent response signals with said representations of initial response signals recorded in step (b2), to determine whether the telecommunication system produced the proper response signals, and
    (d2) indicating whether the telecommunication system produced the proper response signals in response to the test signals reproduced in step (c).

18. A method as recited in claim 16,
    wherein said reproducing in step (c) comprises the substep of:
    (c1) reproducing the test signals recorded in step (b1).

19. A method as recited in claim 18,
    wherein said recording in step (b) further comprises the substep of:
    (b3) automatically adding representations of subsequent response signals to the file recorded in step (b2), said subsequent response signals produced in response to the test signals reproduced in step (c1).

20. A method as recited in claim 16,
    wherein said reproducing in step (c) comprises the substep of:
    (c1) reproducing the test signals recorded in step (b2).

21. A method as recited in claim 16,
    wherein said recording in steps (b1) and (b2) further includes automatically recording representations of signaling data, timing information, and test status information.

22. A method as recited in claim 21, wherein said representations of signaling data include DTMF signals, MF signals, and indications of changes in polarity.

23. A method as recited in claim 21, wherein said representations of timing information include expected response times, said expected response times including the time when a response signal is expected relative to the time when a test signal is transmitted.

24. A method as recited in claim 21, wherein said representations of test status information include collection type, said collection type selected from the group consisting of DTMF signals, MF signals, and voice signals.

25. A method as recited in claim 24, wherein said collection type is DTMF signals, wherein said recording in step (b1) further includes recording a first instruction to collect DTMF signals from the telecommunication system, and wherein said recording in step (b2) further includes recording said first instruction to collect DTMF signals from the telecommunication system, recording a second instruction to save representations of the DTMF signals in said file, and recording a third instruction to compare said representations of the DTMF signals with the representations of the initial response signals.

26. A method as recited in claim 24, wherein said collection type is MF signals, wherein said recording in step (b1) further includes recording a first instruction to collect MF signals from the telecommunication system, and wherein said recording in step (b2) further includes recording said first instruction to collect MF signals from the telecommunication system, recording a second instruction to save representations of the MF signals in said file, and recording a third instruction to compare said representations of the MF signals with the representations of the initial response signals.

27. A method as recited in claim 24, wherein said collection type is voice signals, wherein said recording in step (b1) further includes recording a first instruction to collect voice signals from the telecommunication system, and wherein said recording in step (b2) further includes recording said first instruction to collect voice signals from the telecommunication system, recording a second instruction to save representations of the voice signals in said file, recording a third instruction to reserve a speech recognition device, recording a fourth instruction to direct said speech recognition device to analyze the representations of the voice signals, and recording a fifth instruction to compare said representations of the voice signals with the representations of the initial response signals.

28. A method of testing a telecommunication system using a data processing device, the system being connectable to a telecommunication network, comprising the steps of:

(a) connecting the data processing device to the telecommunication system, without connection through a telecommunication network;

(b) interactively transmitting test signals to the telecommunication system and detecting response signals produced by the telecommunication system, said test signals simulating user data and signaling data; and (c) evaluating the response signals to determine whether the telecommunication system is operating properly.

29. A method as recited in claim 28, wherein said interactively transmitting and detecting in step (b) comprises the substeps of:
 (b1) transmitting test signals to the telecommunication system,
 (b2) detecting response signals produced by the telecommunication system,
 (b3) transmitting test signals to the telecommunication system based on the response signals detected in step (b2), and
 (b4) repeating steps (b2) and (b3) until the telecommunication system is fully tested.

30. A method as recited in claim 28, wherein said evaluating in step (c) comprises the substeps of:
 (c1) comparing the response signals detected in step (b) with expected response signals, to determine whether the telecommunication system produced the proper response signals, and
 (c2) indicating whether the telecommunication system produced the proper response signals in response to the test signals transmitted in step (b).

* * * * *